United States Patent
Myers

(10) Patent No.: US 6,524,609 B1
(45) Date of Patent: Feb. 25, 2003

(54) TREATING ARTHRITIS IN ANIMALS WITH DIETARY SUPPLEMENTS

(75) Inventor: Andrew Myers, Boise, ID (US)

(73) Assignee: Nutri-Vet, LLC, Phoenix, AZ (US)

(*) Notice: Subject to any disclaimer, the term of this patent is extended or adjusted under 35 U.S.C. 154(b) by 0 days.

(21) Appl. No.: 09/642,112

(22) Filed: Aug. 18, 2000

Related U.S. Application Data

(60) Provisional application No. 60/149,779, filed on Aug. 18, 1999.

(51) Int. Cl.$^7$ .............................................. A61K 47/00

(52) U.S. Cl. ..................... 424/439; 424/400; 424/438; 424/441; 424/442; 424/464; 424/484; 424/489

(58) Field of Search ................................ 424/400, 438, 424/439, 441, 442, 464, 484, 489

(56) References Cited

U.S. PATENT DOCUMENTS

| | | | |
|---|---|---|---|
| 4,680,309 A | 7/1987 | Maurer | 514/499 |
| 4,853,373 A | 8/1989 | Livingston | 514/46 |
| 5,310,759 A | 5/1994 | Bockman | 514/573 |
| 5,364,845 A * | 11/1994 | Henderson | 514/54 |
| 5,399,347 A | 3/1995 | Trentham et al. | 424/184.1 |
| 5,529,786 A | 6/1996 | Moore | 424/464 |
| 5,587,363 A * | 12/1996 | Henderson | 514/54 |
| 5,720,955 A | 2/1998 | Weiner et al. | 424/184.1 |
| 5,750,144 A | 5/1998 | Moore | 424/451 |
| 5,840,715 A * | 11/1998 | Florio | 514/62 |
| 5,843,445 A | 12/1998 | Weiner et al. | 424/184.1 |
| 5,849,323 A | 12/1998 | Braswell et al. | 424/439 |
| 5,849,336 A | 12/1998 | Aoyagi et al. | 424/570 |
| 6,024,960 A * | 2/2000 | Kharazmi et al. | 424/765 |
| 6,139,872 A * | 10/2000 | Walsh | 424/464 |

OTHER PUBLICATIONS

Vidal y Plana R.R., Bizzarri D., Rovati A.L., "Articular Cartilage Pharmacology: I. In Vitro Studies on Glucosamine and Non Steroidal Anti Inflammatory Drugs", *Pharmacological Research Communications*, vol. 10, No. 6, 1978, pp. 557–569.

Kirkpatrick, C.J; Mohr, W; Haferkamp, O; Abstract of "Influence of Zinc and Copper on Lapine Articular Chondrocytes In Monolayer Culture: Morphology, Proliferation and Proteoglycan Synthesis", *Exp. Cell Biol*, 1982, 50:2 pp. 108–114.

Sandy, JD; Adams, ME; Billingham, ME; PLAAS, A; Muir, H; Abstract of "In Vivo and In Vitro Stimulation of Chondrocyte Biosynthetic Activity In Early Experimental Osteoarthritis", *Arthritis Rheum*, Apr. 1984, 27:4, pp. 388–397.

Gray, ML; Pizzanelli, AM; Grodzinsky, AJ; Lee, RC: Abstract of "Mechanical and Physiochemical Determinants of the Chondrocyte Biosynthetic Response", *J Orthop Res*, 1988, 6:6, pp. 777–792.

Schalkwijk, J; Joosten, LA; Van den Berg, WB; Van Wyk, JJ; Van de Putte, LB; Abstract of "Insulin–Like Growth Factor Stimulation of Chrondrocyte Proteoglycan Synthesis By Human Synovial Fluid", *Arthritis Rheum*, Jan. 1989, 31:1, pp. 66–71.

Jones, DG; Smith, RL; Abstract of "Stimulation of Adult Chrondrocyte Metabolism by a Thyroid–Derived Factor", *J Orthrop Res*, Mar. 1990, 8:2, pp. 227–233.

Verschure, PJ; Joosten, LA; Van der Kraan, PM; Van den Berg, WB; Abstract of "Responsiveness of Articular Cartilage From Normal and Inflamed Mouse Knee Joints to Various Growth Factors", *Ann. Rheum Dis*, Jul. 1994, 53:7, pp. 455–460.

Koolpe, M; Benton, HP; Abstract of "Calcium–Mobilizing Purine Receptors on the Surface of Mamalian Articular Chondrocytes", *J. Orthop Res*, Mar. 1997, 15.2 pp. 204–212.

Venezian, R; Shenker, BJ; Datar, S; Leboy, PS; Abstract of "Modulation of Chrondrocyte Proliferation by Ascorbic Acid and BMP–2", *J. Cell Physiol*, Mar. 1998, 174:3, pp. 331–341.

McCluggage, Dave, "Better Health Through Natural Methods", *Natural Pet Magazine*, Mar./Apr. 1998, p 66–67.

"Canine Hip Dysplasia: An Unpredictable Disorder", *Dog Watch*, Dec. 1997, vol. 1, No. 10, p. 5–8.

(List continued on next page.)

*Primary Examiner*—Thurman K. Page
*Assistant Examiner*—Charesse Evans
(74) *Attorney, Agent, or Firm*—Pedersen & Co., PLLC; Ken J. Pedersen; Barbara S. Pedersen

(57) ABSTRACT

The invention is a dietary supplement for animals, especially dogs, for treating arthritis and joint discomfort. A biscuit form of the supplement may be in the form of a conventional carrier composition of, for example, typical dog biscuit materials including cereal grains, vegetables or animal meat, fat and by-products. Typically, the biscuit contains about 89–97 weight percent (wt. %) of the conventional carrier composition. Optional vitamins and minerals may also be added to the carrier material, typically in about the 1–5 wt. % range. Importantly, the biscuit of the present invention contains about 3–7 wt. % of an arthritis-treating combination, namely, glucosamine sulfate, vitamin C and an array of intracellular ions namely potassium, sodium and iodine. The glucosamine component is present by weight at approximately the same level as the vitamin C, and at approximately 10 (ten) times the level of the sum of the above-named intracellular ions. The biscuit is formulated so that its composition is approximately:

Glucosamine component, 5 mg to 5,000 mg;
  Vitamin C component, 5 mg to 3,000 mg;
  Potassium component, 50 mcg to 150 mg;
  Sodium component, 50 mcg to 150 mg; and
  Iodine component, 25 mcg to 100 mg.

The biscuit is dosed at approximately 10 mg glucosamine component per pound of body weight of the animal per day.

2 Claims, No Drawings

OTHER PUBLICATIONS

Kerwin, S. et al., "Roundtable on Canine Osteoarthritis, Soothing Those Sore Joints", *Veterinary Forum,* Oct. 1997, p. 54–61.

Anderson, M. et al., "Evaluation of Clinical Efficacy of an Oral Glucosamine—Chondroitin Sulfate Compound", Survey of Veterinary Practices in the United States, 24$^{th}$ Annual Conference Veterinary Orthopedic Society, Mar. 1997, p. 1.

Koopman, William J., "Etiopathogenesis of Osteoarthritis", *Arthritis and Allied Conditions, A Textbook of Rheumatology,* 13$^{th}$ Edition, 1997, p. 1969–1984.

Hanson, Reid R., "Oral Glycosaminoglycans In Treatment of Degenerative Joint Disease in Horses", *Equine Practice,* Nov.–Dec. 1996, vol. 18, No. 10, p. 18–22.

Anderson, Mark et al., "Glycosaminoglycans in the Treatment of Degenerative Joint Disease in Small Animals", *Emerging Science & Technology,* Summer 1996, p 38 & 40.

Boothe, D. et al., "Roundtable Discussion—Degenerative Joint Disease in Dogs, Part 4", *Canine Practice,* Jul.–Aug. 1996, vol. 21, No. 4, p. 19–23.

Boothe, D. et al., "Roundtable Discussion—Degenerative Joint Disease in Dogs, Part 3", *Canine Practice,* May–Jun. 1996, vol. 21, No. 3, p. 21–24.

Boothe, D. et al., "Roundtable Discussion—Degenerative Joint Disease in Dogs, Part 2", *Canine Practice,* Mar.–Apr. 1996, vol. 21, No. 2, p. 20–25.

Boothe, D. et al., "Roundtable Discussion—Degenerative Joint Disease in Dogs, Part 1", *Canine Practice,* Jan.–Feb. 1996, vol. 21, No. 1, p. 6–10.

Budavari, Susan, Description of Chondroitin Sulfate, *The Merck Index—An Encyclopedia of Chemicals Drugs, and Biologicals, 12$^{th}$* Edition, 1996, p. 371.

Budavari, Susan, Description of Glucosamine, *The Merck Index—An Encyclopedia of Chemical Drugs, and Biologicals,* 12$^{th}$ Edition, 1996, p. 758.

Bucci, Luke, Glycosaminoglycans, *Nutrition Applied to Injury Rehabilitation and Sports Medicine,* 1995, p. 177–203.

Muller–Fabbender, H. et al., "Glucosamine Sulfate Compared to Ibuprofen In Osteoarthritis of the Knee", *Osteoarthritis and Cartilage,* vol. 2, No. 1, Mar. 1994, p. 61–69.

Fichard, A. et al., "Another Look at Collagen V and XI Molecules", *Matrix Biology,* vol. 14, 1994, p. 515–531.

Diab, Mohammad, "The Role of Type IX Collagen in Osteoarthritis and Rheumatoid Arthritis", *Orthopaedic Review,* vol. 12, No. 2, Feb. 1993, p. 165–170.

Clark, David M., "The Biochemistry of Degenerative Joint Disease and Its Treatment", *Compendium on Continuing Education for the Practicing Veterinarian,* vol. 13(2), Feb. 1991, p. 275–281.

Setnikar, I. et al., "Pharmacokinetics of Glucosamine in the Dog and In Man", *Arneimittel–Forschung/Drug Research,* Apr. 1986, p. 729–735.

Palmoski, Marshall et al., "Effects of Some Nonsteroidal Antiinflammatory Drugs on Proteoglycan Metabolism and Organization In Canine Articular Cartilage", *Arthritis and Rheumatism,* vol. 23, No. 9, Sep. 1980, p. 1010–1020.

Drovanti, A. et al., "Therapeutic Activity of Oral Glucosamine Sulfate in Osteoarthrosis: A Placebo–Controlled Double–Blind Investigation", *Clinical Therapeutics,* vol. 3, No. 4, 1980, p. 260–272.

* cited by examiner

TREATING ARTHRITIS IN ANIMALS WITH DIETARY SUPPLEMENTS

This application claims benefit of Provisional Application Serial No. 60/149,779 filed Aug. 18, 1999.

DESCRIPTION

BACKGROUND OF THE INVENTION

1. Field of the Invention

This invention relates generally to animals and animal nutrition. More specifically, this invention relates to treating arthritis and joint discomfort in dogs by use of dietary supplements.

2. Related Art

Degenerative joint diseases or arthroses are conditions where degenerative changes in cartilage lead to a breakdown in the integrity of the structural matrix of cartilage or tendinous tissues. Conventionally referred to as arthritis, the complaints associated with the degenerative changes occur most frequently in aged individuals.

Arthritis is much more common in dogs than other domesticated pets. Arthritis is a terrible disease, as it causes pain and restricts mobility. Any dog can be afflicted with arthritis, although older dogs and larger breeds can be more susceptible. Active dogs, like work or hunting dogs, may also be at greater risk because of their increased activity levels.

Arthritis affects primarily the weight bearing joints (hips, knees, etc.) and the joints of the toes. Symptoms include early morning stiffness, stiffness following periods of rest, pain that worsens on joint use, and loss of joint function.

Arthritis can take one of several forms.

1. Hip dysplasia is a malformation of the hip sockets that allows excessive movement in the joint, causing chronic inflammation and thus furthers breakdown and the deposition of calcium.
2. Dislocation of the kneecap is a malformation of the leg bones such that the kneecap is repeatedly pulled out of position, thus slipping back and forth and causing continuous low-grade inflammation. This is a condition seen in small breeds and is related to low-quality food and poor breeding.
3. Degeneration of the shoulder joint involves the breakdown of cartilage in this joint, leading to inflammation and pain on movement. This is a condition often seen in medium to large breeds.
4. Arthritis of the elbow is a condition that is caused by improper bone formation and is considered by many in the field to be hereditary. It is generally seen in German shepherds. Nutrition, however, may be a more significant factor than generally understood.
5. Swelling and pain in the leg joints is a condition seen in young dogs (a few months in age) of the large breeds that is apparently due to inadequate formation of vitamin C and is the result of heredity and poor nutrition.

Cartilage provides the cushion and frictionless mobility of joints. Comprised of two key components, collagen and glycosaminoglycans (GAG), cartilage is constantly under a process of natural repair and regeneration. Because of overuse, injury or other causes, many individuals overwhelm their body's ability to keep up with the natural process of repair. The result is cartilage which becomes increasingly dry and inflexible leading to pain and eventual joint restriction.

The pathogenesis of arthroses is by no means an inevitable phenomenon of aging, as a healthy joint is capable of functioning for a lifetime. In medical science, a differentiation is made between primary and secondary arthroses. Secondary arthroses develops from known precedent diseases, whereas primary arthroses is not known to develop from any determinable basic disease. Rather, cases of primary arthroses disease manifest in an imbalance between mechanical stress and mechanical resistance of the joint cartilage.

A predisposition to arthritis can be passed to a dog during its fetal development. Many of the more common joint health problems can be avoided by providing adequate nutrition for females throughout their pregnancy. Adequate fetal nutrition can help offset the expression of genetics.

For most dogs, age-related concerns of use and overuse are more common than genetic factors. If one considers the activity level of most dogs, the wear and tear on their joint tissues can be exceptional. Although the body has natural mechanisms for repairing joint tissues as well as cartilage, age and excessive wear can exceed the pet's repair mechanisms. Once damage exceeds repair, there is often an increase in inflammation and a vicious cycle is set into play, further restricting repair.

Although many drugs can be used to treat the symptoms of arthritis, the only sure-fire way to break the cycle of damage is to support the pet's natural cartilage repair systems. This can be accomplished by supplementing the dog with additional nutrition targeted at supporting cartilage repair and joint health.

The conservative treatment measures in the cases of coxarthroses and gonarthroses, and operative measures such as artificial joint prosthesis, are sufficiently known.

Steroids such as corticosteroids, and other anti-inflammatory materials such as nonsteroidal anti-immflamatories (NSAIDs) and high doses of aspirin, are widely used for the treatment of these ailments (Pharmocol. Res. Commun. 10 557–569 (1978) by Vidal et al). While these materials often relieve the pain and swelling associated with maladies arising from connective tissue problems, they offer no support for repair processes. Furthermore, NSAIDs may also inhibit the body's own natural healing processes, leading to further deterioration of the connective tissue.

The activity of chondrocytes (cartilage cells) is regulated by factors including the level of intracellular ions. Up-regulation of chondrocytes, in combination with the presence of GAG building blocks, produces repair of cartilage tissues under normal and arthritic conditions.

Bone, or osseous tissue, is a rigid form of connective tissue that constitutes most of the skeleton of higher vertebrates. The intercellular matrix of bone contains an organic component, chiefly collagenous fibers, and an inorganic component that accounts for approximately two thirds the weight of bone. The inorganic component are the salts responsible for the hardness and rigidity of the tissue. The collagenous fibers contribute greatly to the strength and resiliency of bone.

SUMMARY OF THE INVENTION

It is the object of the present invention to provide agents for the treatment of arthroses that as much as possible have alleviating and curing effects on arthroses, while they are well compatible and readily received in the form of a nutritional biscuit.

To that end, a unique therapeutic composition comprising nutritional elements important to the repair and regeneration of joint and connective tissues is proposed. Further, a supplemental ratio of ionic nutrients is offered as a mechanism for promoting and supporting the use of aforementioned nutritional elements in cartilage repair and reconstruction. This unique blend of nutritional elements is supplied in a convenient biscuit format.

The most important supplemental nutrient for the treatment of arthritis is glucosamine. Glucosamine is a building block for cartilage itself. A naturally occurring compound, glucosamine is used to construct one of the structural elements of cartilage called glycosaminoglycans.

Supplemental glucosamine can help to reverse the cycle of damage and help to support the dog's natural cartilage repair mechanisms. The best news about glucosamine is that it not only treats arthritis, but it can also be used preventively to help support and maintain joint health. This is especially true for large breeds of dogs, hunting or work dogs, and any dog that has a predisposition to joint health problems.

Research on glucosamine is extensive and its use in humans for the treatment of osteoarthritis speaks not only to its efficacy, but also its safety. Dosing for glucosamine may be accomplished by the body weight of the dog.

The activity of chondrocytes is regulated by factors including the level of intracellular ions. Up-regulation of chondrocytes in combination with the presence of GAG building blocks produces repair of cartilage tissues under normal and arthritic conditions.

This invention seeks to introduce a novel and unique composition aimed at providing not only the building blocks of cartilaginous repair, in the form of glucosamine sulfate, but also nutritional elements designed to increase the activity of cells responsible for carrying out repair, known as chondrocytes.

The invention is a dietary supplement for animals, especially dogs. The supplement is for treating arthritis and joint discomfort by means of a preferable tasty and nutritious biscuit. The preferred biscuit of the present invention comprises a conventional carrier composition made of, for example, typical dog biscuit materials including cereal grains, vegetables or animal meat, fat and by-products. Typically, the biscuit comprises about 89–97 weight percent (wt. %) of such a conventional carrier composition. Also, optional vitamins and minerals may also be added to this carrier material, typically in about the 1–5 wt. % range. Also, the biscuit of the present invention comprises about 3–7 wt. % of an arthritis-treating combination, namely glucosamine sulfate, vitamin C and an array of intracellular ions, namely potassium, sodium and iodine. The glucosamine component is present by weight at approximately the same level as the vitamin C, and at approximately 10 (ten) times the level of the sum of the above-named intracellular ions. The biscuit is formulated so that its composition, dosed according to body weight of the animal to be treated, is approximately:

Glucosamine component, 5 mg to 5,000 mg;
Vitamin C component, 5 mg to 5,000 mg;
Potassium component, 50 mcg to 150 mg;
Sodium component, 50 mcg to 150 mg; and
Iodine component, 25 mcg to 100 mg.

DESCRIPTION OF THE PREFERRED EMBODIMENTS

The invention is a dietary supplement for animals, especially dogs. The supplement is for treating arthritis and joint discomfort in dogs. The supplement is preferably in the form of a specially-formulated biscuit, designed as a treat for dogs.

The preferred biscuit comprises a conventional carrier material, comprising, for example, cereal grains, vegetables, animal meat, fat and by-products. Blends and mixtures of these materials, as well as other conventional carrier materials for dog biscuits, may also be used. If the biscuit is being designed for an animal different from the dog, then the carrier material may be adjusted to be tasty for the animal. For example, for horses the carrier material may be mostly grass or hay.

Typically, the carrier material comprises about 89–97 wt. % of the biscuit. This wt. % range may be adjusted up or down, depending upon whether other, optional ingredients are added. For example, conventional vitamins and minerals such as B vitamins, vitamin E, and calcium may be added to the biscuit without reducing its efficacy. Typically, these vitamins and minerals may be added to amount to about 1–5 wt. % of the biscuit. However, this wt. % range may also be adjusted up or down, depending upon the total number of optional ingredients, and the total weight of each optional ingredient.

Also, the biscuit comprises about 3–7 wt. % of an arthritis-treating combination, namely glucosamine sulfate, vitamin C and an array of intracellular ions, namely potassium, sodium and iodine.

So, the carrier material and the optional vitamins and minerals of the biscuit of the present invention may be made from conventional raw materials or purchased from conventional sources. Also, the biscuit of the present invention may be formulated and manufactured by conventional techniques.

Also, the subject dietary supplement may be formulated as a grainy meal with a component composition similar to the biscuit. Also, the subject dietary supplement may be formulated as a formed tablet, containing about 80–85 weight percent of the arthritis-treating combination, with the balance being binder and/or carrier material. Also, the subject dietary supplement may be formulated as a powder containing about 100 weight percent of the arthritis-treating combination. The powder may be free-flowing, or packaged in digestible gelatin capsules, for example.

The arthritis-treating combination is what makes the present invention unique. First, a glucosamine sulfate is provided in combination with a vitamin C component, in approximately equal amounts within the stated ranges. Effective glucosamine components include glucosamine, its precursors and derivatives, like glucosamine hydrochloride, for example, other amine sugars, as well as salts and esters of these components, and including mixtures thereof. These components are well known in the nutrition industry, and may be made from conventional raw materials or bought from conventional sources.

The vitamin C component is ascorbic acid or ascorbate and/or esterified versions thereof, including mixtures thereof. These components are also well-known in the nutrition industry, and may be made from conventional raw materials or bought from conventional resources.

In addition, the biscuit of the present invention comprises an array of intracellular ions, namely potassium ($K^+$), sodium ($Na^+$) and iodine ($I^{3+}$). The sum of the amount of these ionic components is typically about one-tenth ($\frac{1}{10}$) times the level of the glucosamine component and the level of the vitamin C component. Within the array of these ionic components, typically the amount of the potassium is approximately equal to the amount of the sodium, and the individual amounts of each of these components is about twice the amount of the iodine.

In biscuit compositions wherein an unusually high level (more than twice the typical conventional background level) of any of these arthritis-treating components is provided by the carrier material or by added optional vitamins and minerals, then the composite amounts of the arthritis-treating materials may be adjusted downwardly according. For weight-percent amounts and calculations herein, the amount of the individual component, and not its entire compound, or complexed species, is considered.

Analytical methods for determining the amount of components in the composition of the present invention are conventional.

Preferred Embodiment and Ingredient Dosages

Glucosamine equivalent dosage for animals: 10 mg per pound of body weight

The preferred embodiment of the therapeutic composition is a biscuit providing 1,000 mg of glucosamine in a six (6) biscuits daily dosage for dogs over 75 pounds and over. For dogs 50 to 75 pounds, five (5) biscuits per day. For dogs 25 to 50 pounds, four (4) biscuits per day, and for dogs under 25 pounds, three (3) biscuits per day.

The additional nutritional ingredients comprising the composition may be dosed according to the following: Vitamin C is present by weight at approximately the same level as glucosamine, and at approximately 10 times the weight of the intracellular ions potassium, sodium and iodine.

EXAMPLES

1. Labrador retriever, age 5 years, body weight approximately 110 pounds, presented with mild degenerative changes to hips as reported by owners. Owners complained of reduced vitality and agility for over 1 year. Dog given six (6) biscuits daily over course of 3 months with positive improvements in agility and overall activity level.

2. Golden retriever, age 10 years, body weight approximately 100 pounds, presented with progressive osteoarthritis exemplified by poor hind-quarter movement and flexibility. Owners report big reductions in mobility over last year. Dog given six (6) biscuits daily over period of six (6) months with marked improvements in mobility.

3. Miniature poodle, age 9 years, body weight approximately 20 pounds, presented with reported severe restriction in mobility related to age and apparent arthritis in pet. Dog fed three (3) biscuits per day with positive changes in under 5 weeks of supplementation.

I claim:

1. A dietary supplement for animals, comprising:
    A glucosamine component;
    A vitamin C component;
    A potassium component;
    A sodium component; and
    An iodine component, wherein:
        the supplement is combined at about 3–7 weight percent in a biscuit;
        the glucosamine component . . . ; and,
        the potassium component and the sodium component are . . . the iodine component.

2. A method of treating arthritis in animals, comprising:
    dosing the animal with dietary supplement comprising:
        a glucosamine component;
        a vitamin C component;
        a potassium component;
        a sodium component; and
        an iodine component, wherein the supplement is combined at about 3–7 weight percent in a biscuit;
the glucosamine component and the vitamin C component are present in approximately equal weight amounts, and each of them are present in approximately 10 times the total weight amount of the potassium, sodium and iodine components; and,
the potassium component and the sodium component are present in approximately equal weight amounts, and each of them are present in approximately 2 times the amount of the iodine component at approximately 10 mg glucosamine component per pound of body weight of the animal per day.

* * * * *

UNITED STATES PATENT AND TRADEMARK OFFICE
CERTIFICATE OF CORRECTION

PATENT NO. : 6,524,609 B1 Page 1 of 1
DATED : February 25, 2003
INVENTOR(S) : Myers, Andrew It is certified that error appears in the above-identified patent and that said Letters Patent is hereby corrected as shown below:

Column 6,
Line 19, delete "...." and insert -- and the vitamin C component are present in approximately equal weight amounts, and each of them are present in approximately 10 times the total weight of the potassium, sodium and iodine components; -- in its place.
Line 21, delete "..." and insert -- present in approximately equal weight amounts, and each of them are present in approximately 2 times the amount of -- in its place.
Line 23, insert the word -- a -- between the words "with" and "dietary."

Signed and Sealed this

Nineteenth Day of August, 2003

JAMES E. ROGAN
*Director of the United States Patent and Trademark Office*